US007296811B2

(12) United States Patent
Pettit

(10) Patent No.: US 7,296,811 B2
(45) Date of Patent: Nov. 20, 2007

(54) WHEELCHAIR PROPULSION DEVICE

(76) Inventor: Frank P. Pettit, 4910 Fox St., Studio A, Denver, CO (US) 80216

(*) Notice: Subject to any disclaimer, the term of this patent is extended or adjusted under 35 U.S.C. 154(b) by 380 days.

(21) Appl. No.: 10/865,079

(22) Filed: Jun. 10, 2004

(65) Prior Publication Data

US 2005/0275190 A1 Dec. 15, 2005

(51) Int. Cl.
*B62M 1/14* (2006.01)

(52) U.S. Cl. ................ 280/250.1; 280/247; 280/242.1; 280/244

(58) Field of Classification Search .................... 74/89, 74/99 R, 101, 102, 104, 111, 142, 143, 145, 74/148, 156, 160, 162; 280/250.1, 244, 242.1
See application file for complete search history.

(56) References Cited

U.S. PATENT DOCUMENTS 3,189,368 A * 6/1965 Petersen .................. 280/250.1
3,309,110 A * 3/1967 Buhner .................... 280/250.1
3,623,748 A * 11/1971 Haynes ....................... 280/202
3,877,725 A * 4/1975 Barroza ................... 280/250.1
4,538,826 A * 9/1985 Lemarie .................. 280/250.1
4,993,732 A * 2/1991 Wedemeyer ............. 280/250.1
5,232,236 A * 8/1993 Korpi ...................... 280/250.1
5,988,661 A * 11/1999 Garfinkle ................. 280/250.1
6,158,757 A * 12/2000 Tidcomb ................. 280/250.1
6,634,663 B2 * 10/2003 Mitchell .................. 280/250.1
2005/0269797 A1 * 12/2005 Mitchell .................. 280/242.1
2006/0261571 A1 * 11/2006 Mitchell .................. 280/250.1

* cited by examiner

*Primary Examiner*—Lesley D. Morris
*Assistant Examiner*—Daniel Yeagley
(74) *Attorney, Agent, or Firm*—Ruth Evre

(57) ABSTRACT

This invention provides wheelchair propulsion devices that do not contact the axles of the wheels to which they are attached, that decrease the amount of force required to propel the wheelchair, and that can be easily installed. The devices toggle between sliding with and engaging with the push ring depending on the force applied by the user. This invention provides kits comprising a device of this invention and instructions for assembling the device, instructions for using the device, and/or a device for the opposite side of the wheelchair. This invention provides methods for propelling a wheelchair. This invention provides non-axle-contacting, manual wheelchair propulsion devices for use by a wheelchair rider. The devices contact the push ring of a wheelchair in three or more locations.

1 Claim, 6 Drawing Sheets

WHEELCHAIR PROPULSION DEVICE

FIELD OF THE INVENTION

The present invention relates to the field of wheelchairs and wheelchair attachments and more specifically to manually propelled devices for wheelchairs.

BACKGROUND OF THE INVENTION

Wheel chairs are generally driven by the user grasping a push ring which is attached to the periphery of the supportive wheels. This is not adequate for the user who lacks sufficient arm strength or full control and use of her or his hands and arms. Several devices have been put forth to address this problem. A brief discussion of a representative sampling of these devices is set forth below.

U.S. Pat. No. 3,877,725 to Barroza describes a handle which is grasped by the user and pivots from the axle of the wheel. In this device, the user would advance the handle forward to a suitable distance forward on the wheel, and a clamp would grasp the push ring thereby advancing the chair forward.

U.S. Pat. No. 4,538,826 to Lemarie describes another axle mounted device in the form of a caliper assembly which fits over the axle and terminates in a handle for actuation by the user.

U.S. Pat. No. 3,869,146 to Bulmer sets forth another axle-mounted single handle device comprising a lever or handle extending outwardly from the axle to the handle. This device is formed to grip a push ring of a large wheel upon a propulsion stroke and to release its grip of the ring upon the return stroke.

Other devices, all of which comprise a single handle radiating from and pivoting from the axle of the main wheel, are found in U.S. Pat. No. 6,634,663 to Mitchell, U.S. Pat. No. 4,354,691 to Saunders and Lowe, and U.S. Pat. No. 3,189,368 to Petersen.

All of these devices have only one point of contact with the wheel push ring and are wheel axle pivoted with complex mechanical grips between the device and the wheel. None of the above cited references describe the secant configured device of the present invention. The secant configuration loosely grips the wheelchair push ring in two places instead of one, thereby lending stability and a mechanical advantage over the devices of the prior art. Also, since the device of the present invention does not attach at the axle, it eliminates the need for significant chair modification and eliminates additional stress to the axle that is present in prior art devices.

SUMMARY OF THE INVENTION

This invention provides wheelchair propulsion devices comprising two or more clips slidingly attachable to a wheelchair push ring; an arm pivotally and rigidly connected to the clips and aligned to form a secant of the circle of the push ring, the push ring having a smaller arc defined by the secant; a toggle grip rigidly attachable to the arm and capable of toggling between slidingly and engageably attachable to the arc of the push ring; a handle attached to the toggle grip capable of receiving a force and transferring the force to the toggle grip; and a means for attaching the clips to the push ring, the arm to the clips, the toggle grip to the arm, and the handle to the toggle grip; wherein applying a forward or reverse force to the handle engages the toggle grip with the push ring. The devices do not contact the axles of the wheels to which they are attached.

This invention provides devices for decreasing the force required to propel a wheelchair, e.g. by about 40%. This invention provides devices that engage with push rings by application of a force that is equal to or more than about one ounce. This invention provides devices wherein a decrease or removal of the force enables the toggle grip to toggle back and to disengage with and slide on the push ring. In the devices of this invention, when no force or less than about one ounce of force is applied to the handle, the device slides on the push ring.

Optionally, the toggle grip has a frictional interior side surface and application of a second force on the device, directed into an attached wheelchair, brakes the wheelchair. Optionally, the toggle grip comprises an inner toggle grip and an outer toggle grip. In the devices of this invention, the arm stabilizes the toggle grip.

Optionally, the device also comprises one or more components selected from the group of components consisting of: two or more braces, a stop, a stop clip, a sliding bracket, a toggle grip shaft, a handle shaft; and an attachment means for the component. Optionally, the clips are slidingly and rigidly attached to the push ring with braces and screws, wherein the arm is pivotally and rigidly attached to the clips with the screws that are used to attach the clips to the braces, wherein the arm is rigidly attached to the sliding bracket by a screw, wherein the sliding bracket is slidingly and rigidly attached to the toggle grip shaft by a sliding screw, wherein the toggle grip shaft is pivotally attached to the toggle grip by a loose nut/bolt and two foam pads, wherein the toggle grip is rigidly attached to the handle shaft by two screws, wherein the handle is rigidly attached to the handle shaft with glue, wherein the stop is welded to the handle shaft, and wherein the stop clip is rigidly attached to the wheelchair by a screw at a location at which the stop contacts and is supported by the stop clip when the device is not in use.

Optionally, the toggle grip comprises a springing material. Optionally, the springing material comprises foam.

This invention provides kits comprising a device of this invention and instructions for assembling the device and/or using the device. This invention provides kits comprising left- and right-sided devices.

This invention provides methods for propelling a wheelchair comprising providing a wheelchair propulsion device of this invention; providing a wheelchair having a push ring; installing the device on the wheelchair; applying a forward or reverse force to the handle; engaging the toggle grip with the push ring; and rotating the push ring. Optionally the methods further comprise removing the force; applying an opposite force to the handle; sliding the device over the push ring; and repeating steps applying the forward or reverse force, engaging, and rotating.

This invention provides methods for propelling a wheelchair comprising providing a wheelchair having a push ring; providing a wheelchair rider and seating the rider in the wheelchair; providing a non-axle-contacting manual wheelchair propulsion device for use by the wheelchair rider; installing the device on the wheelchair push ring wherein the device slides on the push ring; applying a forward or reverse force to the device, wherein the rider applies the force; engaging the device with the push ring; and rotating the push ring.

This invention provides non-axle-contacting, manual wheelchair propulsion devices for use by a wheelchair rider.

DETAILED DESCRIPTION OF THE INVENTION

Figure 1:
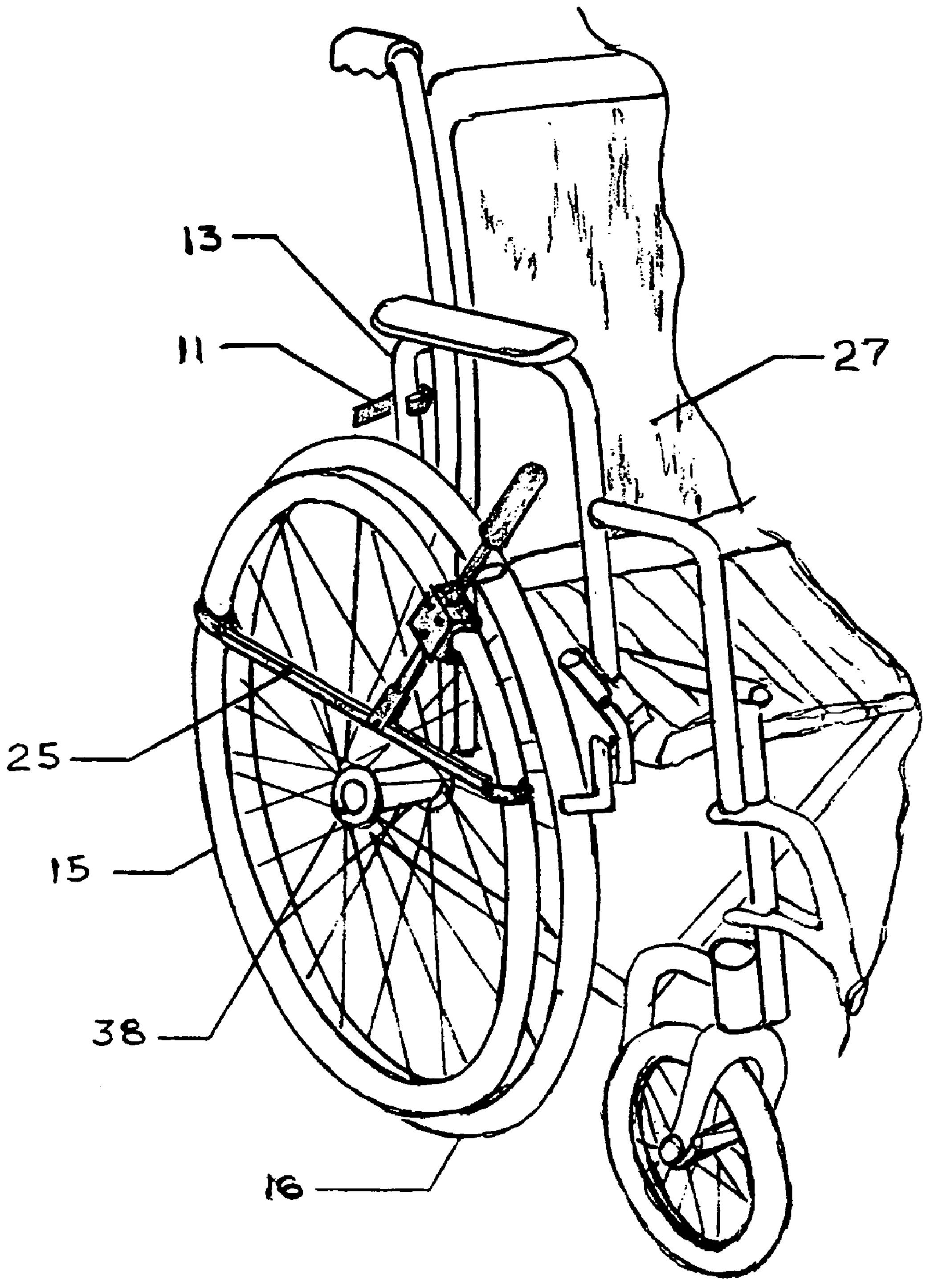
FIG. 1 is an illustration showing a perspective view of the device of this invention mounted on a wheelchair.

As used herein, "secant" refers to a straight line cutting a circle at two points wherein the line does not intersect the center of the circle. As used herein, "secant configuration" refers to elements configured to form a secant.

The present invention provides a unique design for propelling manual wheelchairs. The present invention reduces physical arm hand and shoulder stresses due to pushing the push rings of a wheelchair by lengthening the lever length and eliminates the repetitive hand and forearm strains which result from repeatedly grasping the push ring during normal wheelchair usage.

The device of the present invention is attached to the push ring in three places, instead of one, as is the common design in the prior art. Two of the attachments are sliding connections with minimal friction. These two points of attachment form a secant configuration. The two points of contact between the device and the wheel push ring form a secant configuration which lends stability and a mechanical advantage over the devices of the prior art. The third attachment occurs along the smaller arc between the first two attachments. The third attachment is an engageable and slideable attachment. The third attachment is capable of propelling, reversing, and braking the wheelchair. The device of the present invention can be distinguished from the prior art in that it does not attach at the axle of the wheel and that it has three or more connections with the push ring. It is advantageous to not attach at the axle and avoid imposing additional stress on the axle. An attachment stress of the device on any single point of the wheelchair is reduced by about a factor or two as a result of the secant configuration.

The increase in the lever length and the secant configuration of the device reduces the force required to propel the wheelchair by about 50%.

Alternatively, when the handles are in an "at rest" position, the chair can be pushed or used in the normal hands-on-ring fashion. Gravity holds the device out of engagement against a stop when not in use so that the movement of the chair is not impeded when the device is not being used.

It is another object of the present invention to provide a wheelchair attachment which is easy to install or remove on most typical new or used wheel chairs without chair modifications.

It is still another object of the present invention to provide a wheelchair attachment which is simple to operate and assists the user in moving the chair with a minimum of effort by retaining the device in an accessible starting position and automatically returns the device to the starting position when the driving stroke is completed.

It is still another object of the present invention to provide a wheelchair attachment device which is adjustable to various sizes of wheelchairs and is economical to manufacture, and easy to operate and maintain.

This invention provides a device comprising at least two stabilizer arm clips which are slidingly attachable to a wheelchair push ring, a secant stabilizer arm attached to the two clips, a toggle grip shaft aligned radially and attached to the secant stabilizer arm, a toggle grip which is engagingly and slidingly attachable to a wheelchair push ring, and a handle attached to and extending peripherally from the toggle grip.

The stabilizer arm clips can attach to the push ring with stabilizer arm braces, and the clip and/or brace can have interior surfaces that minimize friction with the push ring while stabilizing the device. The stabilizer arm clips can be pivotally connected to the stabilizer arm, to allow the clips to be rotated into a radial alignment with push ring at the point of contact. The toggle grip shaft can be attached to the secant stabilizer arm with a sliding and bracket to allow the device to be adjusted for varying wheelchair sizes. The toggle grip can be pivotally attached to the shaft and held in place with springy material to allow the toggle grip to be engaged with or disengaged from and sliding along the push ring. The toggle grip can comprise an outer toggle grip and an inner toggle grip, which are firmly attached around the push ring. The inner toggle grip can be the portion attached to the shaft. The handle can be attached to a handle shaft which is attached to the outer toggle grip. The handle is positioned to be easily accessible and useable by a wheelchair user.

Optionally the device of this invention also comprises a protrusion to stop the device in a rest position. Optionally the device also comprises a stop clip and a means for attaching it to a wheelchair for contacting the stop. The protrusion can be U-shaped and the stop attachment means can comprise a screw. The stop clip can be attached to many parts of a wheelchair including an arm rest tube and a parking brake mechanism. The stop clip is attached at a location that does not interfere with use of the device and use of the wheelchair without the device, and also a location that is convenient for the user.

The springs allow the angle of the toggle grip, optionally of both the outer and inner portions, to be changed relative to the push ring, by application of a forward or reverse force on the handle by the user. The change in angle engages the toggle grip which results in the push ring rotating and the wheel moving forwards or backwards. The springs also allow the toggle grip to return to the disengaged position when the force is removed. The spring material is strong enough for regular use, springy enough to quickly return to a disengaged position, and pliable enough to not require excessive force for compression. The width of the spring is selected to allow enough of an angle change to allow for engagement with the push ring. Optionally the springy material is made of industrial foam.

The device is made using materials that are strong and rigid enough to withstand regular use and are adjustable, as selected. Optionally the stabilizer clips, braces, arm, toggle grip shaft, toggle grip, handle shaft, stop, stop clip, and connecting means are made of metal. Optionally the handle is plastic.

The handle shaft and handle are radially aligned and extend outward from the push ring, thereby increasing the lever length of an applied force. The radially aligned shafts of the devices of this invention do not intersect or contact the axle.

In operation, applying a forward or reverse tipping force to the handle, tips the toggle grip a few degrees of arc and engages the push ring. Continued application of force propels the wheelchair in the direction of tipping. When there are equivalent devices on each of the left and right sides of the chair, equal force applied to the device on each side propels the wheelchair straight forward or reverse. When unequal force is applied to each side, the wheelchair is propelled in a curve toward the side receiving less force. The toggle grip is designed to minimize friction when not engaged. Optionally the toggle grip is designed to have an inner side surface having a high coefficient of friction that functions as a frictional brake surface, so that force directing the toggle grip into the push ring from the outside brakes the push ring. This allows the user to pull the handles inward to provide a braking action.

The sliding connection for the toggle grip shaft at the secant arm bracket allows the device to accommodate some radius variations in the push ring and the secant arm loose fitting push ring clips allow some push ring flattening to denting while providing the desired effortless movements.

The devices of this invention make wheelchairs easier to use. The devices of this invention decrease the amount of force that is required to be applied by the user to propel the wheelchair an equivalent distance than without using the device, as a result of the increased lever length. The devices of this invention provide a single mechanism for accelerating and decelerating a wheelchair. The devices of this invention increase wheelchair safety because an equivalent decelerating force stops the wheelchair in a shorter distance. The devices of this invention allow more individuals use wheelchair because less strength and dexterity is required to propel, direct, and stop the wheelchair, compared to not using these devices.

The secant configuration of the stabilizer arm of a device of this invention loosely grips the wheelchair push ring in two places instead of one, thereby lending stability and a mechanical advantage over the devices of the prior art. Also, since the device of the present invention does not attach at the axle, it eliminates the need for significant chair modification and eliminates additional stress to the axle that is present in prior art devices.

Table 1 lists the components referred to in the drawings.

TABLE 1

| | |
|---|---|
| 1 | stabilizer arm |
| 2 | stabilizer arm clip brace |
| 3 | stabilizer arm clip |
| 4 | sliding bracket |
| 5 | toggle grip shaft (lower handle shaft) |
| 6 | inner toggle grip (grip arm tube slide) |
| 7 | outer toggle grip |
| 8 | U-shaped protrusion |
| 9 | handle shaft (upper handle shaft) |
| 10 | handle (grip handle) |
| 11 | stop clip |
| 12 | stop clip curve |
| 13 | arm rest tube |
| 14 | axle |
| 15 | push ring |
| 16 | tire |
| 17 | pivot shaft |
| 18 | sliding bolt, sliding screw |
| 19 | stabilizing arm clip and brace sliding surfaces |
| 20 | frictional brake surface |
| 21 | outside gripping surface |

TABLE 1-continued

| | |
|---|---|
| 22 | centering springs (handle shaft mounting bracket) |
| 23 | inside gripping surface |
| 24 | central horizontal channel |
| 25 | wheelchair propelling device |
| 26 | embedded handle shaft |
| 27 | typical wheelchair |
| 28 | radially aligned slot |
| 29 | phantom forward handle tilt |
| 30 | phantom reverse handle tilt |
| 31 | handle in slide position |
| 32 | device at rest on park brake shoe |
| 33 | stroke |
| 34 | forward |
| 35 | reverse |
| 36 | stabilizer bar forward end |
| 37 | stabilizer bar rearward end |
| 38 | wheel |

FIG. 1 is a perspective view illustration of a device 25 of this invention installed on the right side of a wheelchair 27. Only about one half of the wheelchair is shown. The device 25 is attached to the push ring 15.

Figure 2:
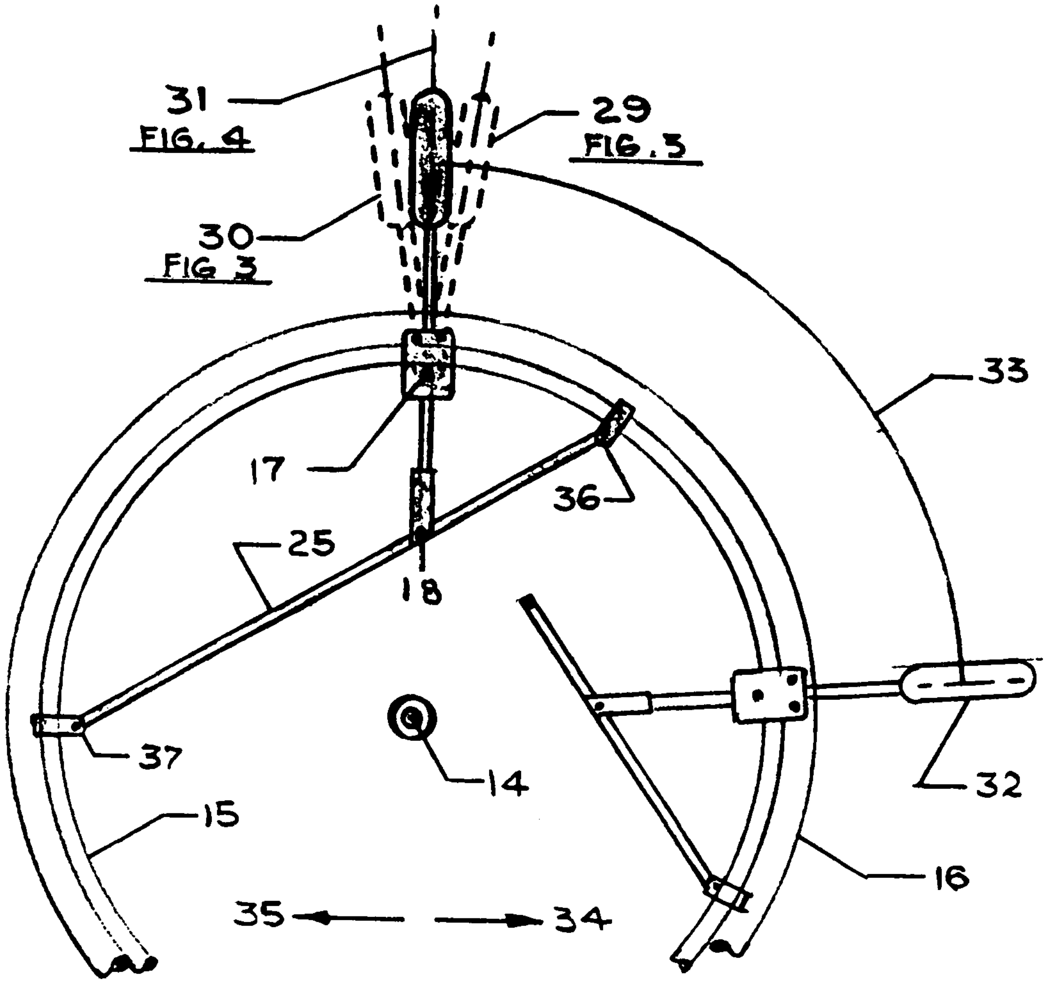
FIG. 2 is a side view illustration of a device of this invention mounted on wheelchair.
Figures 3, 3A, 3B:
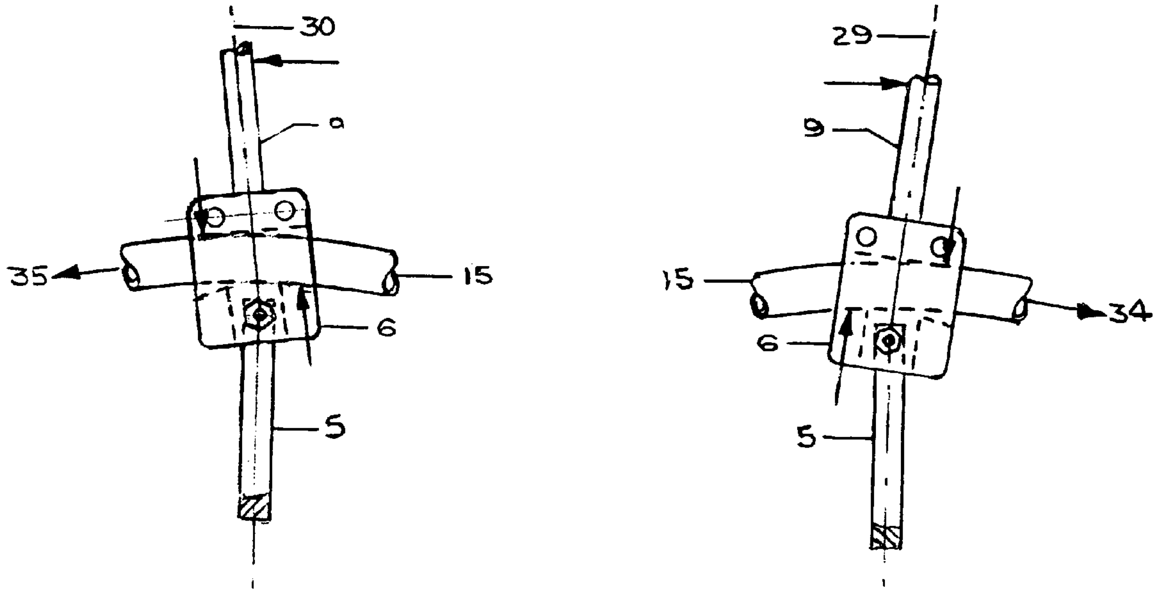
FIGS. 3A and 3B are close-up inside and end view illustrations, respectively, of the toggle-gripping device, showing more details.

FIG. 2 shows the right side of a wheelchair wheel having a device of this invention. Right is forward 34 and left is reverse 35. The stabilizer arm clips 3 are slidingly attached to the push ring 15 with opposing stabilizer clip braces (not shown). The stabilizer arm clips 3 and braces are pivotally and rigidly attached to the stabilizer arm 1 with screws. The stabilizer arm forms a secant on the push ring 15. The stabilizer arm has a forward end 36 and a rearward end 37. A sliding bracket 4 is firmly attached to the stabilizer arm 1 with a screw at about a 60 degree angle with the forward end 36 of the stabilizer arm 1. The sliding bracket 4 has a slot (not shown) for adjustably and rigidly attaching a toggle grip shaft 5 with a tightening screw, thereby adjusting the lever length. The toggle grip shaft 5 and the sliding bracket 4 align with a radius of the push ring, but do not contact or intersect the axis of the push ring circle or the axle 14 of the tire 16. The toggle grip shaft 5 is loosely pivotally connected to inner toggle grip 6 with a nut and bolt. Springy foam centering springs (not shown) are sandwiched between the forward and rearward sides of the inner toggle grip 6 and the toggle grip shaft 5 which form a radially aligned slot (not shown). Screws rigidly attach the outer toggle grip 7 to the inner toggle grip 6. The handle shaft 9 is welded to the outer toggle grip 7. The handle 10 is glued to the handle shaft 9. A U-shaped protrusion (not shown) is attached to the handle shaft 9 and is facing towards the inside of the chair. The inner toggle grip 6 and the outer toggle grip 7 form a channel through which the push ring 15 can slide or be engaged, depending on the angle of the toggle grip 6/7. A stroke 33 leads to the device resting 32 (in phantom) on a park brake shoe.

The device is used to move the chair forward 34 by holding handle 10 and applying a force to move the handle 10 forward (right side of drawing) with a slight tipping action which causes the toggle grip 6/7 to engage with the push ring 15. The handle is shown in forward handle tilt 29 in phantom. A minimum force is required to engage the toggle grip with the push ring. The force required to propel the chair forward in this manner is estimated to be about 3 pounds of force. It is estimated that the amount of force required to propel a wheelchair forward by gripping the wheelchair push rings manually is about 5 pounds of force. The devices of this invention reduce the force required to propel a wheelchair by at least about 10%, 20%, 30%, 40%, 50%, or about 40% or about 50%. Continued application of an equivalent or greater forward force will propel the wheelchair forward 34. Releasing the pressure on the handle allows the handle to return to disengage and return to the slide position 31.

Likewise the handle 10 is moved in a rearward 35 direction to back up the chair. The handle is shown in reverse handle tilt 30 in phantom. To engage the brake, the handle 10 is pulled inward, toward the knees of the user. The braking surface on the inside of toggle grip 6/7 engages with the surface of the push ring and the friction slows and stops the chair.

Figure 4:
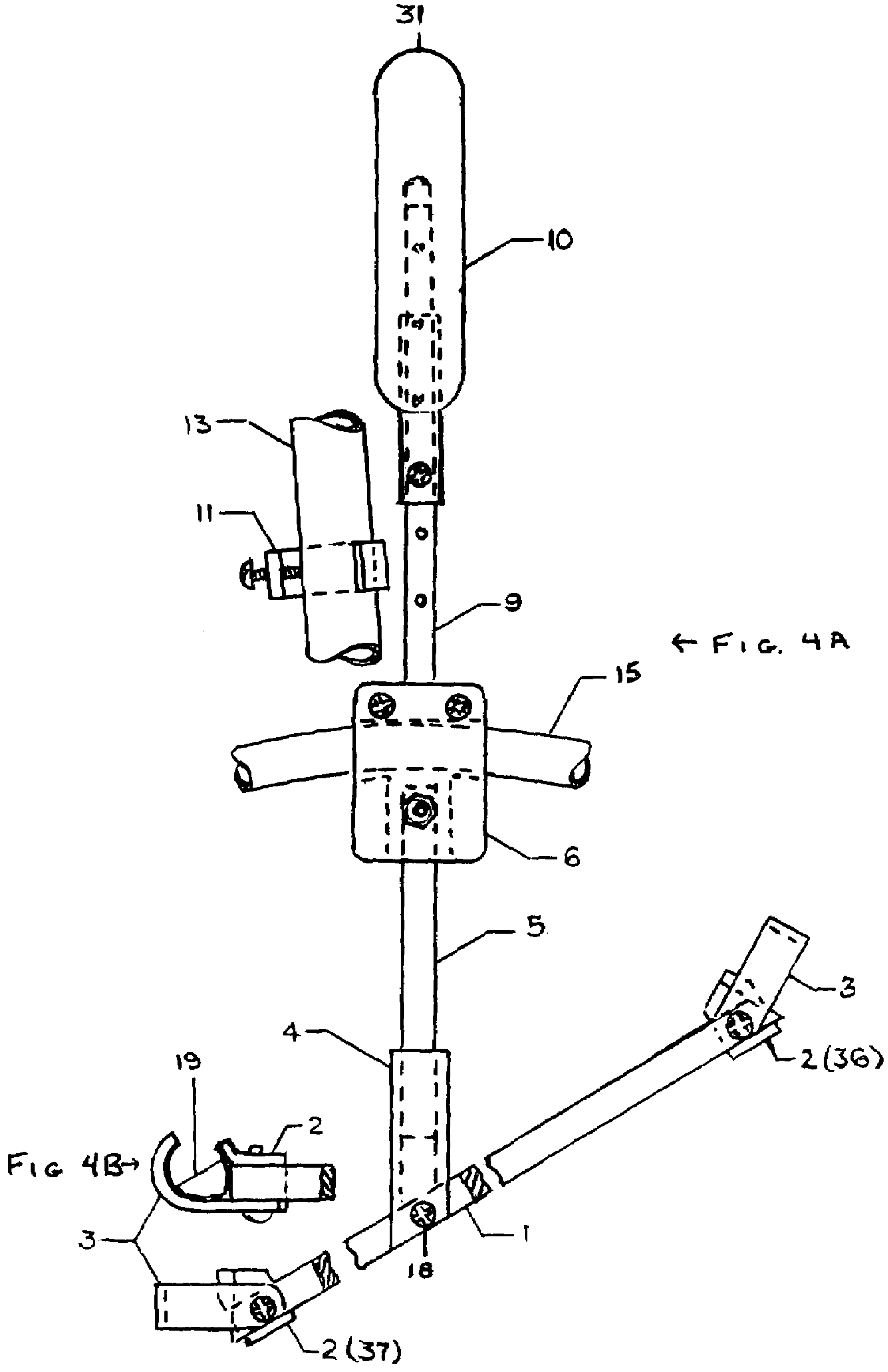
FIG. 4A is a side view illustration of a device of the present invention.
FIG. 4B is a top view of the stabilizing clip and brace.

Turning now to FIGS. 3A, 3B, 4A, and 4B, the toggle grip shaft 5 is connected at its lower end to the stabilizer bar 1 by means of the sliding bracket 4 as mentioned above with a sliding screw or bolt 18. The lower handle shaft 5 is connected at its upper end to the inner toggle grip 6 by means of a rotating nut and bolt pivot shaft 17 into radially aligned slot 28. The inner toggle grip 6 engages the wheelchair push ring in its central horizontal channel 24. This feature can be seen in FIGS. 4A and 4B. The horizontal channel 24 comprises upper and lower curved surfaces for receiving the wheelchair push ring 15. The inner toggle grip 6 also contacts the toggle grip shaft with centering springs 22 in the radially aligned slot 28. The horizontal groove 24 also comprises a frictional brake surface 20 as shown, to act as a brake to stop motion of the wheelchair push ring when the brake surface 20 is pushed inward to contact the wheelchair push ring 15. The upper portion of the outer toggle grip 7 is configured to receive the lower portion of handle shaft 9. Handle shaft 9 terminates at handle 10 at the end opposite the end which engages the outer toggle grip 7. Upper handle shaft 9 also comprises a U-shaped protrusion 8 which acts as an "at rest" stop when U-shaped protrusion 8 abuts stop clip 11. Stop clip 11 can be mounted on the wheelchair so that when the U-shaped protrusion 8 abuts the stop clip 11, handle shaft 9 is placed at any desired position, e.g. an arm rest tube 13, which affords easy access to the handle 10 by the user. The inside of the curved surface of stop clip 11 can be coated with a frictional surface to aid in maintaining a frictional fit on the arm rest tube 13. The tire 16 is shown in FIG. 4A.

In FIG. 4B, the stabilizer arm clip 3 and brace 2 sliding surfaces 19 are visible. The sliding surfaces are specks of metal, such as copper, for example, that are attached to the surface to minimize contact with the push ring 15.

Figure 5:
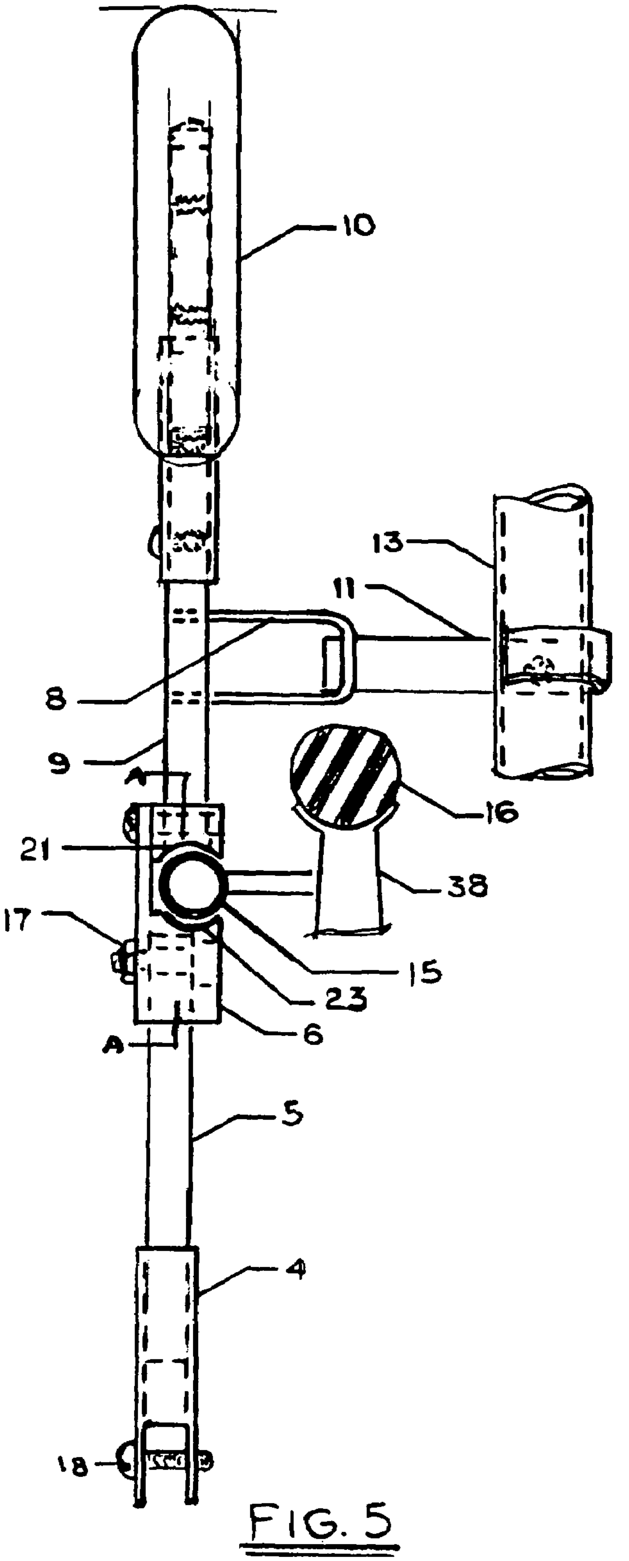
FIG. 5 is a cross-sectional view illustration of a device of the present invention in a resting position.
Figure 6:
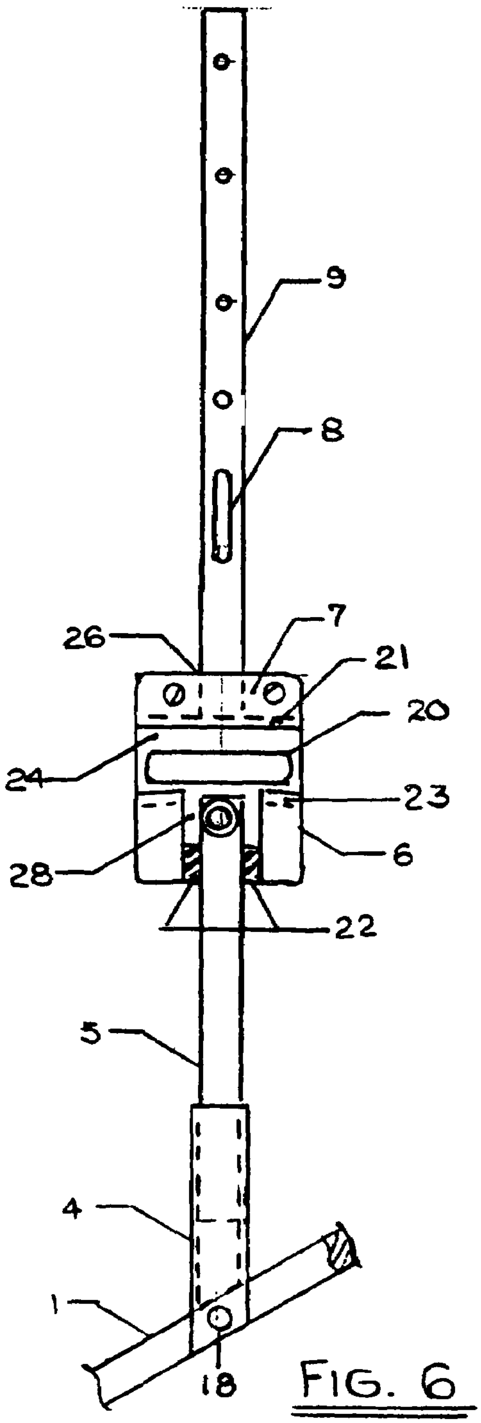
FIG. 6 shows a sectional side view illustration, from A-A in FIG. 5, of the toggle grip device.

FIG. 5 shows a cross-sectional view illustration of a device of the present invention in a resting position and FIG. 6 shows a sectional side view illustration, from A-A in FIG. 5, of the toggle grip device. Most of the elements in FIG. 5 are described in FIGS. 1-4, with a few additions. The wheel 38 is visible. The channel for the push ring 15 between the inner and outer toggle grips 6/7 is more easily visible. The inside gripping surface 23 of the inner toggle grip 6 is now visible. The details of the toggle grip mechanism are more clearly shown in FIG. 6, including the embedded handle shaft 26.

Figure 7:
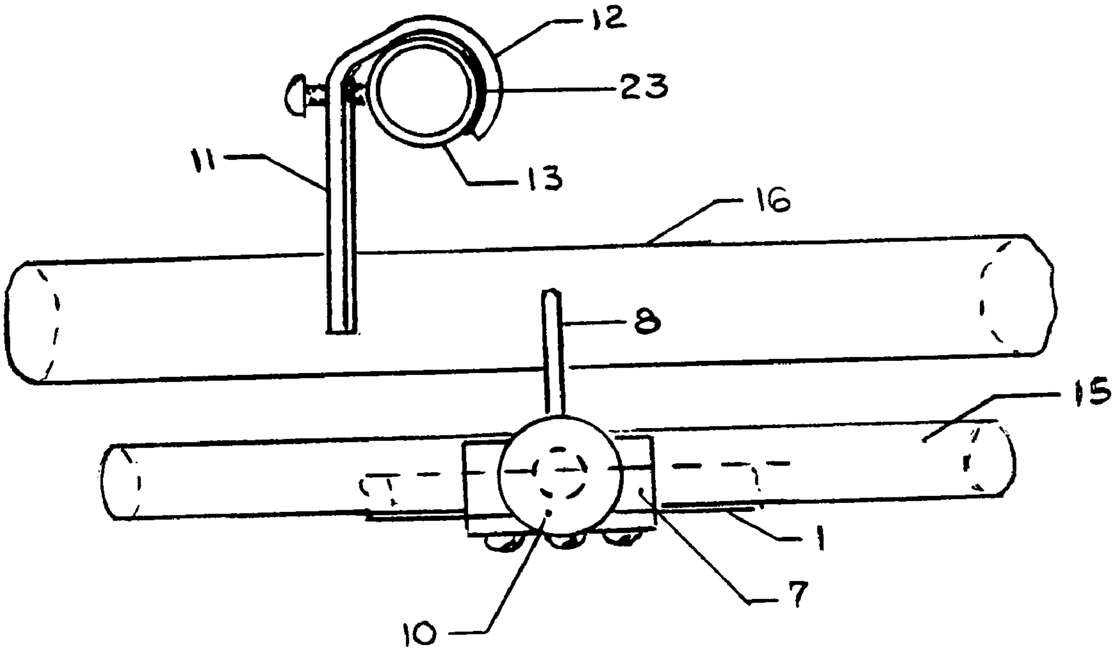
FIG. 7 shows a top view illustration of a device of the present invention as it approaches a resting position.

FIG. 7 shows a top view illustration of a device of the present invention as it approaches a resting position. The stop clip 11 is attached to the arm rest tube 13. The stop clip curve 12 has an inside gripping surface 23. The tire 16 is shown beneath the stop clip 11. The U-shaped protrusion 8 has not yet approached the stop clip 11. The handle 10, outer toggle grip 7, push ring 15, and stabilizer arm 1 are shown.

Materials suitable for use in fabrication of the instant invention include, but are not limited to aluminum, steel, or any other material which affords sufficient structural integrity to allow repeated use without failure.

EXAMPLE 1

A wheelchair propulsion kit and a wheelchair are provided. The wheelchair propulsion kit contains a kit for a left side of a wheelchair and a kit for a right side of a wheelchair. Each side kit contains two stabilizer arm clips, two stabilizer arm clip braces, a stabilizer arm, a sliding bracket, a inner toggle grips pivotally and springly attached to a toggle grip shafts, an outer toggle grip welded to a handle shaft which has a U-shaped protrusion and which is glued to a handle, a stop clip, and screws, nuts, and bolts for attaching the device to the chair.

A device is installed on one side of the chair. Screws are inserted through the stabilizer arm clips, stabilizer arms, and braces around the push ring of the wheelchair so that the shorter distance from the hole in the middle portion of the stabilizer bar to an end is facing the front of the chair. The clips and braces are pivoted into sliding positions with the push ring, and then the screws are tightened. The sliding bracket is radially aligned and attached to the stabilizer arm with a screw through a hole in the stabilizer arm so that the edge of the sliding bracket is about flush with the stabilizer arm. The inner toggle grip and toggle grip shaft are placed adjacent to the inner surface of the push ring, slid into place on the sliding bracket, and secured with a screw. The outer toggle grip, handle shaft, U-shaped protrusion, and handle are placed adjacent to the outer surface of the push ring and secured to the inner toggle grip with two screws. The stop clip is attached to the chair at a convenient location. The other device is installed on the other side of the chair.

As installed, the device slides on the push ring. The user sits in the chair and applies about one ounce of force to engage the push ring. Applying more than about one ounce propels the side of the chair forward or backward in the direction of applied force. When three pounds are applied to the end of the handle, about twelve pounds clamping force press on the push ring from each of the inner toggle grip and the outer toggle grip. About five pounds force is transferred to the push ring. The chair can be decelerated by reducing and/or removing the force applied to the handle. The chair can be decelerated and/or stopped more quickly by applying an inward force on the handle, resulting in friction against the push ring by the toggle grip side inside side surface. By applying equal forces greater than about one ounce on each side of the chair, the user can propel the chair forward or in reverse. By applying opposite or unequal forces to each side, the user can turn the chair. By pulling the handles in towards the center of the chair, the user can brake. The user can allow the handles to rotate and rest on the stop clips, thereby preventing the devices from rotating, and allowing the chair to be pushed or moved by forces applied directly to the push rings.

The wheelchair user will typically apply more than about one ounce of force to one or both devices in a stroke, then apply an opposite force of less than about one ounce Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A wheelchair propulsion device comprising:

a) two or more clips slidingly attachable to a wheelchair push ring;

b) an arm pivotally and rigidly connected to said clips and aligned to form a secant of a circle of the push ring, said push ring having a smaller arc defined by said secant;

c) a toggle grip rigidly attachable to said arm and capable of toggling between slidingly and engageably attachable to said arc of said push ring;

d) a handle attached to said toggle grip capable of receiving a force and transferring said force to said toggle grip; and e) a means for attaching said clips to said push ring, said arm to said clips, said toggle grip to said arm, and said handle to said toggle grip;

wherein applying a forward or reverse force to said handle engages said toggle grip with said push ring, f) also comprising one or more components selected from the group of components consisting of: two or more braces, a stop, a stop clip, a sliding bracket, a toggle grip shaft, a handle shaft; and an attachment means for the component, wherein said clips are slidingly and rigidly attached to said push ring with braces and screws, wherein said arm is pivotably and rigidly attached to said clips with said screws that are used to attach said clips to said braces, wherein said arm is rigidly attached to said sliding bracket by a screw, wherein said sliding bracket is slidingly and rigidly attached to said toggle grip shaft by a tightening screw, wherein said toggle grip shaft is pivotably attached to said toggle grip by a loose nut/bolt and two foam pads, wherein said toggle grip is rigidly attached to said handle shaft by two screws, wherein said handle is rigidly attached to said handle shaft with glue, wherein said stop is welded to said handle shaft, and wherein said stop clip is rigidly attached to said wheelchair by a screw at a location at which said stop contacts and is supported by said stop clip when said device is not in use.

* * * * *